(12) United States Patent
Yagi (10) Patent No.: US 10,951,787 B2
(45) Date of Patent: Mar. 16, 2021

(54) INFORMATION PROCESSING APPARATUS THAT CONTROLS TIMING FOR ENABLING AN APPLICATION, CONTROL METHOD OF INFORMATION PROCESSING APPARATUS, AND RECORDING MEDIUM

(71) Applicant: CANON KABUSHIKI KAISHA, Tokyo (JP)

(72) Inventor: Yuichi Yagi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/407,573

(22) Filed: May 9, 2019

(65) Prior Publication Data

US 2019/0356805 A1    Nov. 21, 2019

(30) Foreign Application Priority Data

May 18, 2018   (JP) .............................. JP2018-095930

(51) Int. Cl.
*H04N 1/00*    (2006.01)

(52) U.S. Cl.
CPC ....... *H04N 1/00938* (2013.01); *H04N 1/0097* (2013.01); *H04N 1/00954* (2013.01)

(58) Field of Classification Search
None
See application file for complete search history.

(56) References Cited

U.S. PATENT DOCUMENTS

| 2001/0056406 | A1* | 12/2001 | Nagoya | .............. | G06Q 30/06 705/52 |
| 2016/0337544 | A1* | 11/2016 | Han | .............. | H04N 1/00933 |
| 2018/0260178 | A1* | 9/2018 | Yamashita | .............. | G06F 3/1203 |

FOREIGN PATENT DOCUMENTS

JP          2004122778 A      4/2004

* cited by examiner

*Primary Examiner* — Lennin R Rodriguezgonzalez
(74) *Attorney, Agent, or Firm* — Rossi, Kimms & McDowell LLP (57) ABSTRACT

An information processing apparatus that can operate an application on firmware comprising: at least one memory that stores a set of instructions; and at least one processor that executes the instructions, the instructions, when executed, causing the information processing apparatus to perform operations comprising: receiving an instruction from a user; performing job determination in which whether or not a job is being executed is determined upon receipt of an instruction to enable an application in the receiving; and activating the application, wherein, in the activating, if it is determined that the job is being executed, the application is activated after the job ends.

11 Claims, 9 Drawing Sheets

| ATTRIBUTE (501) | APPLICATION NAME (502) | ACTIVATION OPERATION AFTER INSTALL (503) | ACTIVATION OPERATION UPON ENABLING (504) | OPERATION DURING UPDATE (505) |
|---|---|---|---|---|
| LOGIN MANAGEMENT | LOGIN MANAGEMENT A | STOP | ACTIVATION AFTER JOB ENDS | UPDATE AFTER JOB ENDS |

| APPLICATION ID (601) | STATE (602) | ATTRIBUTE (501) | APPLICATION NAME (502) | ACTIVATION CONTROL UPON ENABLING (504) |
|---|---|---|---|---|
| 1 | BEING STOPPING | GENERAL-USE | COPY ONE TOUCH | IMMEDIATE ACTIVATION |
| 2 | BEING ACTIVATED | LOGIN MANAGEMENT | LOGIN MANAGEMENT A | ACTIVATION AFTER JOB ENDS |
| 3 | BEING STOPPING | LOGIN MANAGEMENT | LOGIN MANAGEMENT B | ACTIVATION AFTER JOB ENDS |
| 4 | BEING STOPPING | LOGIN MANAGEMENT | LOGIN MANAGEMENT C | CANCEL OF ACTIVATION DURING EXECUTION OF JOB |

| ■ | Login Screen |

User Name | user1

Password | ********

Login

INFORMATION PROCESSING APPARATUS THAT CONTROLS TIMING FOR ENABLING AN APPLICATION, CONTROL METHOD OF INFORMATION PROCESSING APPARATUS, AND RECORDING MEDIUM

BACKGROUND OF THE INVENTION

Field of the Invention

The present invention relates to an information processing apparatus, a control method for an information processing apparatus, and a recording medium, and, in particular, relates to an information processing apparatus that can operate any application on firmware.

Description of the Related Art

Systems that can expand a function of an image forming apparatus by installing an extended application in an image forming apparatus, which is an example of information processing apparatuses, have become widespread. These systems have an execution environment in which the extended application is moved separately from a control application of the image forming apparatus. A device login function that permits the use of the image forming apparatus only for an authenticated user is known (Japanese Patent Laid-Open No. 2004-122778). In the image forming apparatuses that can operate any application on firmware, an image forming apparatus that realizes the above device login function as one of the extended applications is also known. Hereinafter, an application having such a login function is referred to as a "login program".

Commonly, in case of enabling an application on a remote user interface (remote UI), enabling the application regardless of the status of the device is often caused. However, depending on the application to be enabled, it is necessary to change the timing for enabling in accordance with the status of the device. Specifically, if an application such as a login program that occupies a screen of the device is enabled during job execution, the screen switches, and thereby the job may not be cancelled.

SUMMARY OF THE INVENTION

In view of the above disadvantages, the present invention provides an information processing apparatus that controls the timing for enabling an application in accordance with a status of a device.

An information processing apparatus that can operate an application on firmware comprising: at least one memory that stores a set of instructions; and at least one processor that executes the instructions, the instructions, when executed, causing the information processing apparatus to perform operations comprising: receiving an instruction from a user; performing job determination in which whether or not a job is being executed is determined upon receipt of an instruction to enable an application in the receiving; and activating the application, wherein, in the activating, if it is determined that the job is being executed, the application is activated after the job ends.

Further features of the present invention will be described from the following description of the example description with reference to the attached drawings.

DESCRIPTION OF THE EMBODIMENTS

Hereinafter, best modes for carrying out the present invention will be described with reference to drawings and tables. The embodiments below do not limit the invention according to the claims, and all combinations of features described in the embodiments are not necessarily indispensable for means for solving the problem of the invention.

Figure 1:
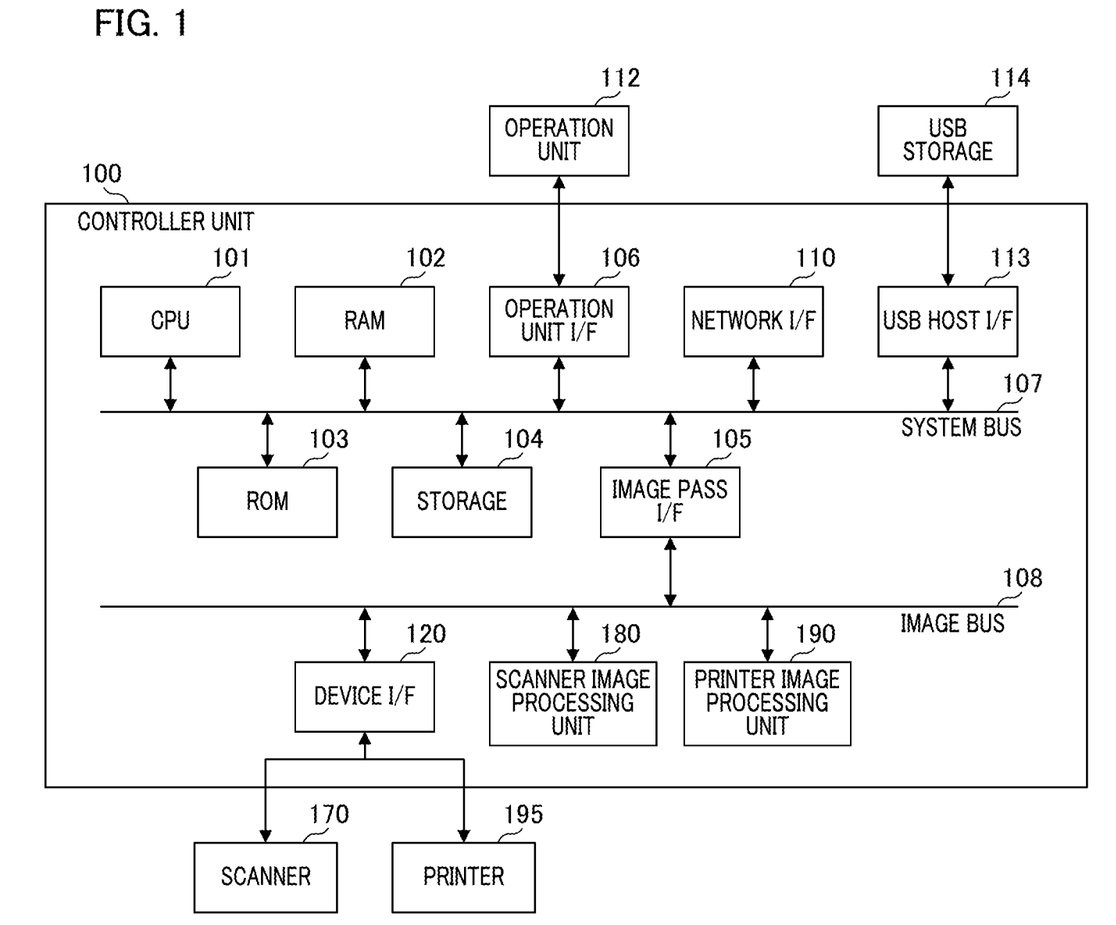
FIG. 1 is a block diagram illustrating an example of a configuration of a main part of an image forming apparatus.

FIG. 1 is a block diagram illustrating an example of a configuration of a main part of an image forming apparatus according to the present embodiment. The image forming apparatus, which is an example of information processing apparatuses, includes a controller unit 100. To the controller unit 100, a scanner 170, which serves as an image input device, and a printer 195, which serves as an image output device, and an operation unit 112 are connected. The controller unit 100 performs control for realizing a copy function that performs print output of the image data that has been read by the scanner 170 through the printer 195.

The controller unit 100 has a CPU 101, and the CPU 101 starts an operation system (OS) by a boot application stored in a ROM 103. The CPU 101 executes an application stored in a storage 104 on this OS, and executes various processing. A RAM 102 is used as a work area of this CPU 101. The RAM 102 provides a work area and provides an image memory area for temporarily storing the image data. The storage 104 stores the application and the image data.

The ROM 103, the RAM 102, an operation unit I/F (operation unit interface) 106, and a network I/F (network interface) 110 are connected to the CPU 101 via a system bus 107. Additionally, a USB host I/F 113 and an image pass I/F (image bus interface) 105 are connected to the CPU 101. The operation unit I/F 106 is an interface with the operation unit 112 having a touch panel and outputs image data to be displayed on the operation unit 112 to the operation unit 112. Additionally, the operation unit I/F 106 transmits the information that has been input by a user in the operation unit 112 to the CPU 101. The network I/F 110 is an interface for connecting the image forming apparatus to the LAN.

The USB host I/F 113 is an interface unit that communicates with a USB storage 114. The USB host I/F 113 is an output unit for causing the USB storage 114 to store the data stored in the storage 104. Additionally, the USB host I/F 113 inputs data stored in the USB storage 114 and provides a notification about the input of the data to the CPU 101. The USB storage 114 is an external storage device that stores data and it can be attached to and detached from the USB host I/F 113. A plurality of USB devices including the USB storage 114 can be connected to the USB host I/F 113.

The image pass I/F 105 is a bus bridge for connecting the system bus 107 and an image bus 108 that transfers the image data at a high speed and converting the data format. The image bus 108 is configured by, for example, a PCI bus or IEEE 1394. On the image bus 108, a device I/F 120, a scanner image processing unit 180, and a printer image processing unit 190 are provided. A scanner 170 and the printer 195 are connected to the device I/F 120, and the device I/F 120 performs conversion of the image data for synchronous and asynchronous systems. The scanner image processing unit 180 corrects, processes, and edits the input image data. The printer image processing unit 190 performs, for example, correction, and resolution conversion on the print output image data in accordance with the printer 195.

Figure 2:
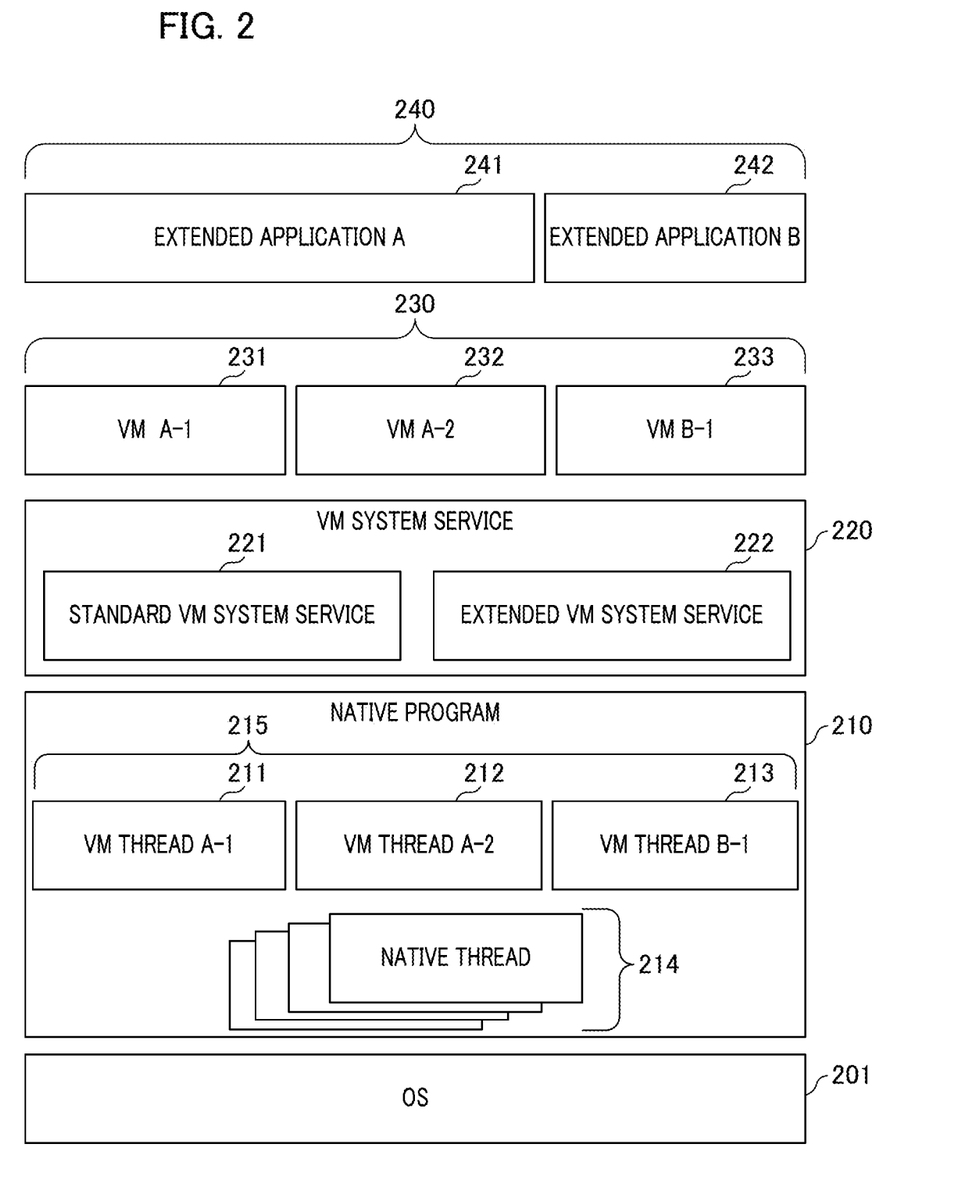
FIG. 2 is a software configuration diagram of the image forming apparatus.

FIG. 2 is a block diagram illustrating an example of an execution environment of an extended application of the image forming apparatus. Each module in FIG. 2 is realized by loading the application stored in the storage 104 into the RAM 102 and executing the application by the CPU 101. On an OS 201, a native program 210 for controlling an image processing unit such as a printer, a facsimile, and a scanner, and a virtual machine (VM) 230 that is an execution environment of the extended application are operating. The VM 230 is a module that understands and executes an application that controls the extended application. The extended application always operates on the VM 230. Although the VM 230 according to the present embodiment is a software module operating on the CPU 101, it may be a hardware module.

In the native program 210, there are native threads 214 for controlling the image processing unit such as a printer, a facsimile, and a scanner, and VM threads 215 for moving the VM 230. The number of the VM threads 215 corresponds to that of the VMs 230. In the present embodiment, three threads, a VM thread A-1 (211), a VM thread A-2 (212), and a VM thread (213) are generated.

A VM system service 220 is a utility library shared from the extended application. By invoking a function of the VM system service 220 from an extended application 240, it is possible to omit the work for developing an extended application or accessing each module of the image forming apparatus. The VM system service 220 includes a standard VM system service 221 that provides a minimum operation as VM and an extended VM system service 222 that accesses each module of the image forming apparatus and provides OS functions.

The VM 230 executes the extended application 240. The VM 230 is generated for each thread of the extended application. In the present embodiment, a VM A-1 (231) and a VM A-2 (232) for moving two threads by an extended application A 241, and a VM B-1 (233) for moving one thread by an extended application B 242 are generated.

Figure 3:
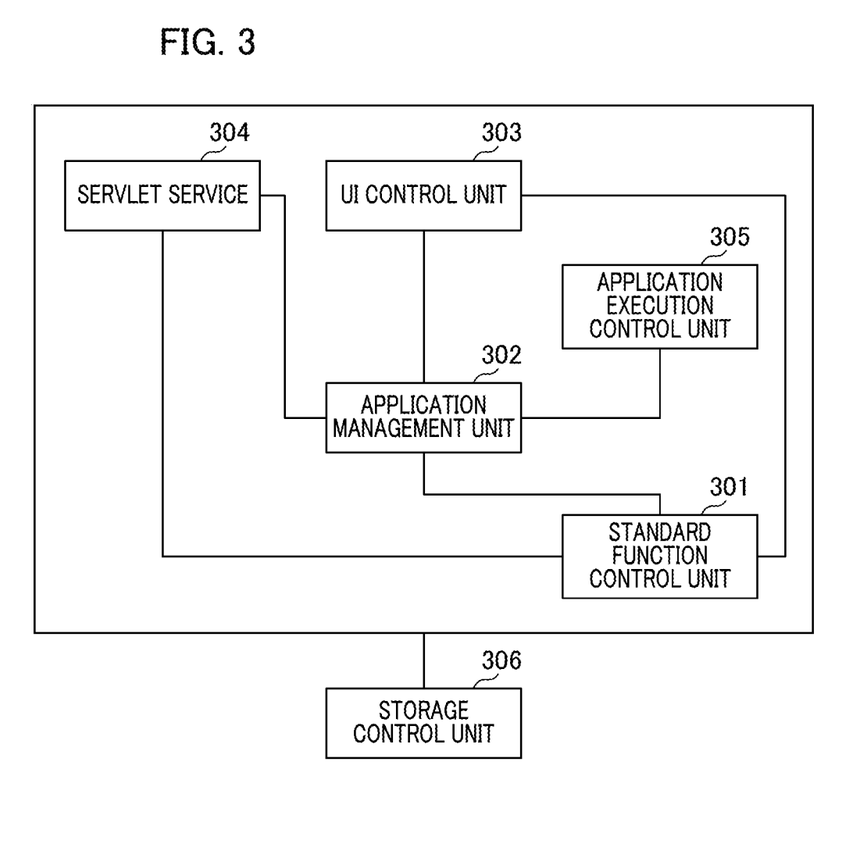
FIG. 3 is a configuration diagram of a software module that operates on the CPU of the image forming apparatus.

FIG. 3 is a configuration diagram of a software module that operates on the CPU 101 of the image forming apparatus according to the present embodiment. If the HTTP access is performed through the network I/F 110, a servlet service 304 allocates processes to the module (an application management unit 302 or a standard function control unit 301) in accordance with the accessed URL. A UI control unit 303 is a module that displays a screen on the operation unit 112, receives an operation from the user, and provides a notification about the operation information to an appropriate module (the application management unit 302 or the standard function control unit 301). The application management unit 302 is a module that performs management such as activation of an installed extended application. An application execution control unit 305 is a module that performs execution control of the application that has been activated by the application management unit 302. Specifically, the application execution control unit 305 controls the VM threads 215, the VM system service 220, the VM 230, and the extended application 240. A storage control unit 306 is a module that records and manages the setting information of the image forming apparatus. Each module accesses the storage control unit 306 and refers to and sets the setting value. The standard function control unit 301 is a module that performs control of a copy and a facsimile, which are standard functions of the image forming apparatus, and performs a control necessary for another image forming apparatus (for example, control of the USB host path I/F 113).

Figure 4:
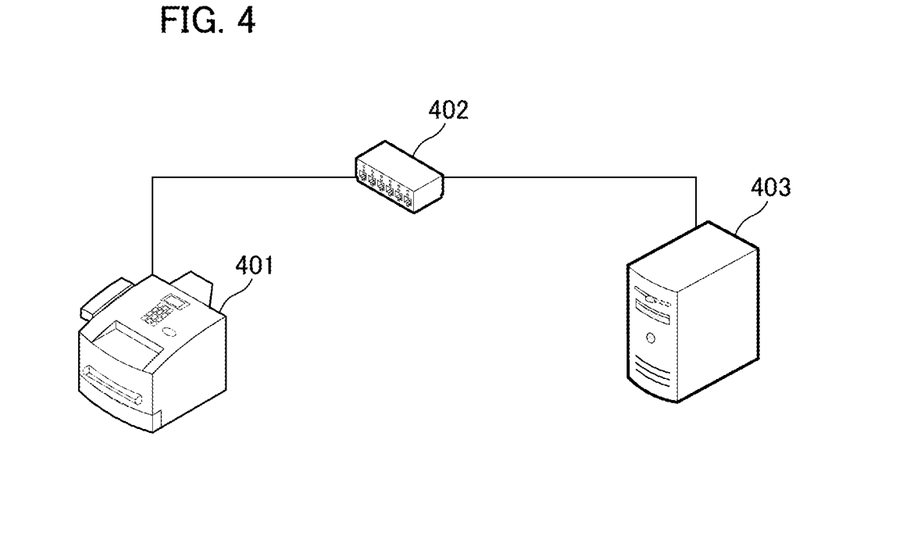
FIG. 4 illustrates the entire network.

FIG. 4 illustrates a device configuration of a printing system including the image forming apparatus according to the present embodiment. The printing system according to the present embodiment is configured by an image forming apparatus 401, a network router 402, and an external device 403. The external device 403 is connected to the image forming apparatus 401 that is connected through network, installs and activates the extended application, and changes the setting of the extended application. The network router 402 mediates communication between the image forming apparatus 401 and the external device 403. The image forming apparatus 401 executes processing based on an instruction from the external device 403 and returns a response.

Figure 5:
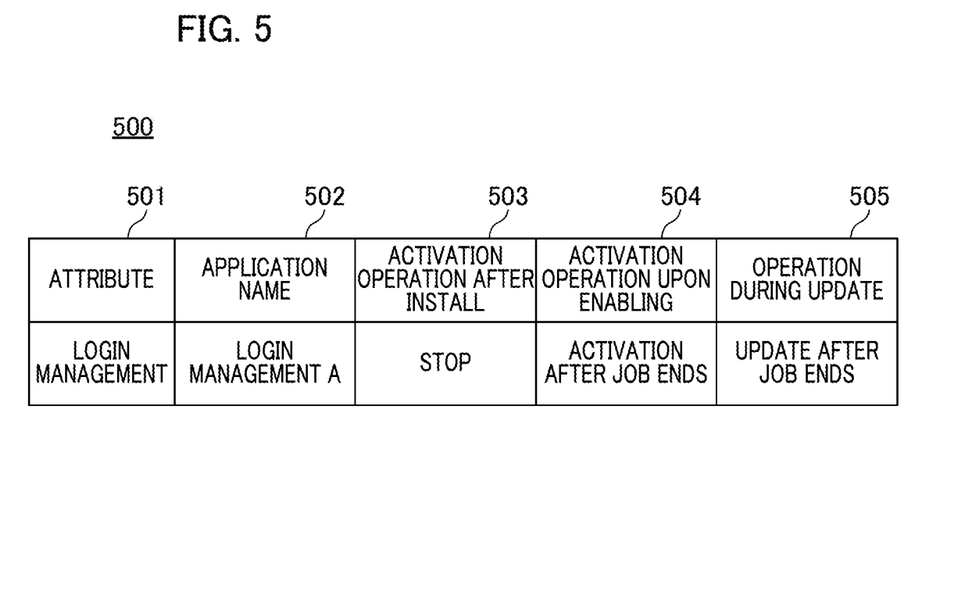
FIG. 5 illustrates control information held by an extended application.

FIG. 5 illustrates control information 500 held by the extended application installed from the external device 403. An application attribute 501 is used to prevent duplication of functions. The application management unit 302 confirms this attribute and prevents duplicate activation of an application having an equivalent function. An application name 502 is a name displayed on a setting screen of an application (not illustrated) of the image forming apparatus 401.

An activation control setting 503 after an install is a setting that is referred to after install. If activation is desired after an install, "activation" is set. If activation is not desired, "stop" is set. An activation control setting (activation setting) 504 during enabling is a setting referred to if enabling has been performed on a setting screen of an application (not illustrated) of the image forming apparatus 401. If immediate activation is desired during enabling, "immediate activation" is set. Note that if "immediate activation" is set, for example, an activation confirmation screen may be displayed during job execution and activation may be performed if permitted. In this case, the job may be interrupted during display of the confirmation screen. If activation is not to be performed, "stop" is set. If activation is to be performed during job execution or after the job ends, "activation after the job ends" is set. If activation is not to be performed during job execution, "cancel activation during job execution" is set.

A control setting 505 during update is a setting referred to during update of the extended application. If immediate update is desired, "immediate update" is set. If update is to be performed after job ends, "update after job ends" is set. If update is not to be performed even if an update instruction is provided during job execution, "cancel update" is set.

Figure 6:
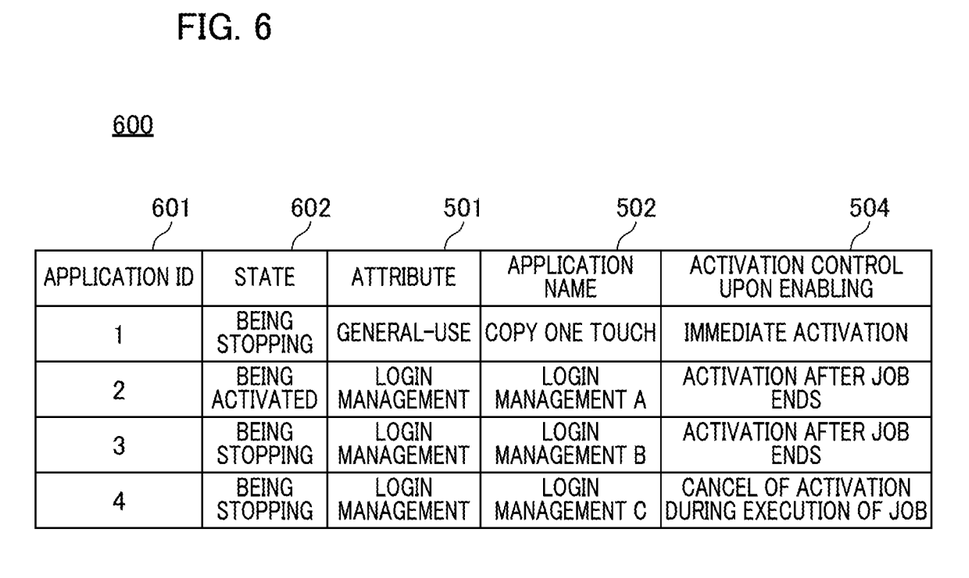
FIG. 6 illustrates activation control information held by the application.

FIG. 6 illustrates an example of activation control information held by the application stored in the storage 104. Activation control information 600 is stored in the storage 104 during installation of the extended application. If the extended application has been activated, each item is updated. An application ID 601 is a unique ID that is assigned by the application management unit 302 during installation. An operation state 602 is information indicating whether or not the application has been activated. The application attribute 501, the application name 502, and the activation control setting 504 in the activation control information 600 are items that are the same as those in the control information 500.

Figure 7:
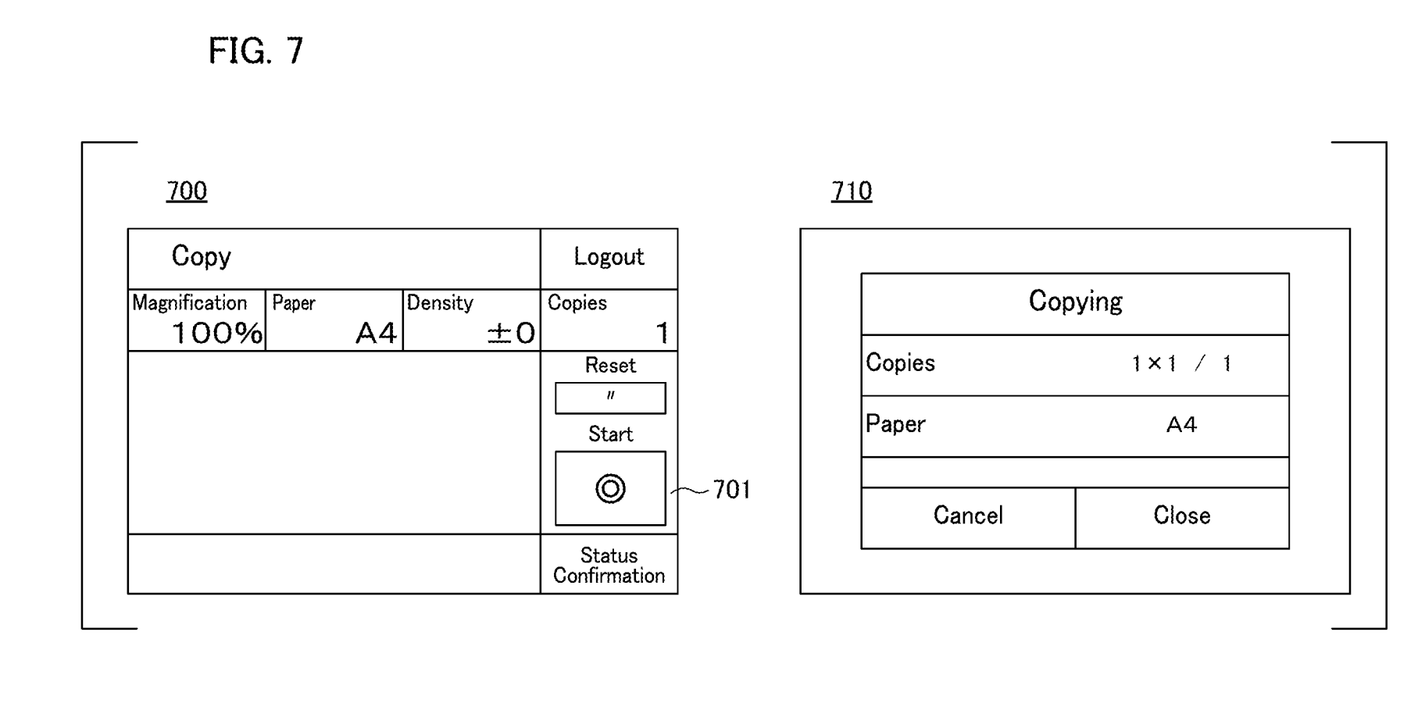
FIG. 7 illustrates an example of a copy screen.
Figure 8:
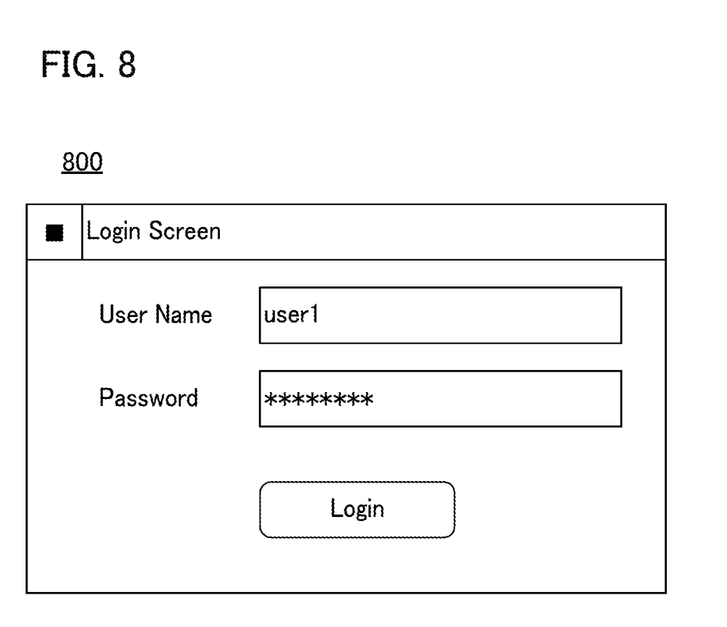
FIG. 8 illustrates a login screen displayed by a login program.

FIG. 7 illustrates an example of a copy screen. By pressing a start key 701 of a copy job setting screen 700, copying starts and a copy execution screen 710 is displayed. Next, FIG. 8 illustrates an example of a login screen 800 displayed by the login program. In the present embodiment, a user name and a password are input on the login screen 800.

Figure 9:
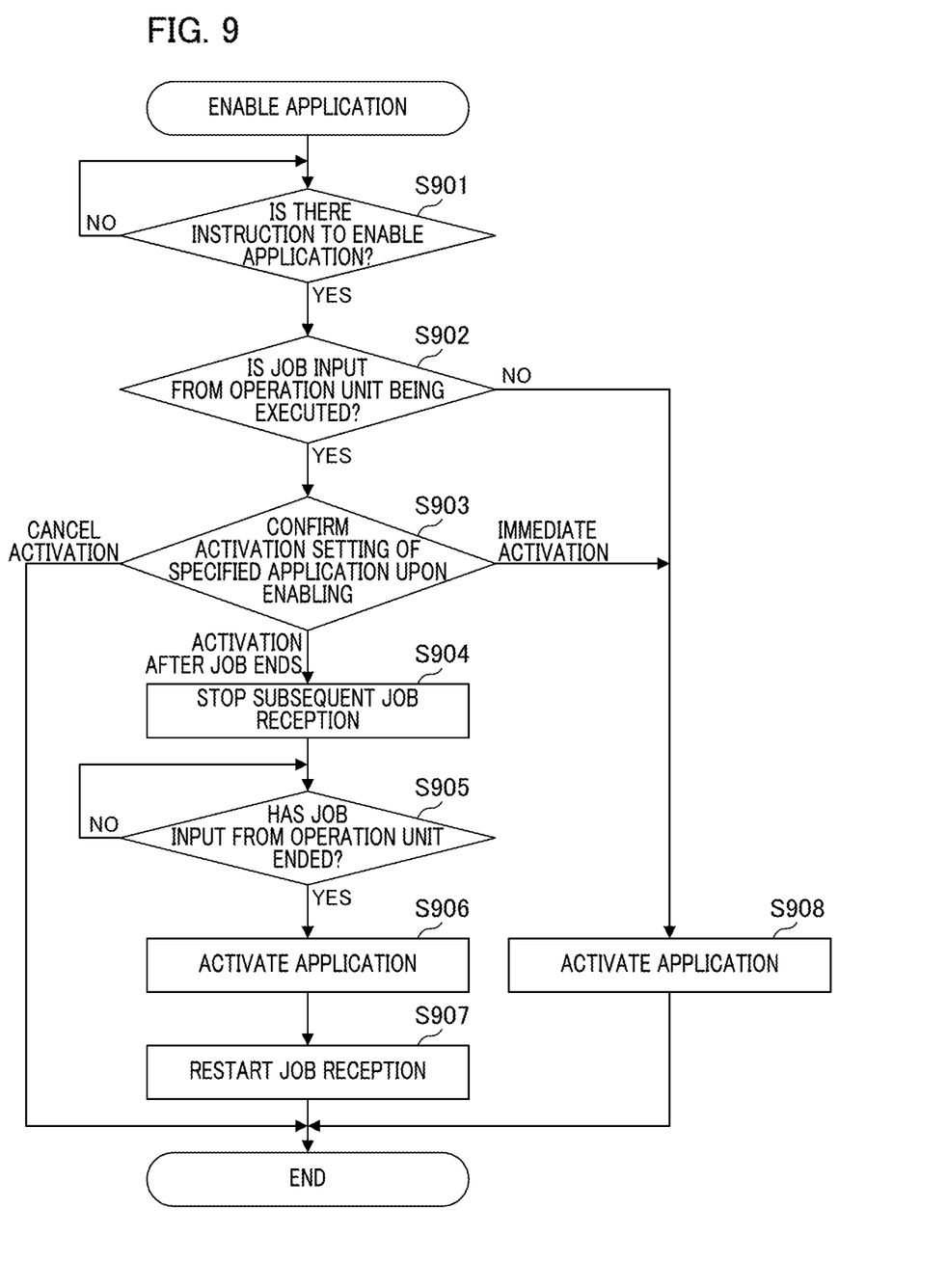
FIG. 9 is a flowchart illustrating an operation upon receipt of an instruction to enable an application.

FIG. 9 is a flowchart illustrating an operation upon receipt of an instruction to enable the application by the application management unit 302. In this flowchart, a process is executed upon receipt of the instruction to enable the application by the application management unit 302 from the external device 403 via the servlet service 304. Each step is executed by the CPU 101.

First, in step 901, a process waits for the instruction to enable the application from the servlet service 304, and upon receipt of the instruction, the process proceeds to step 902. In step 902, in order to determine the job, whether or not the job that has been input from the operation unit I/F 106 is being executed is confirmed to the standard function control unit 301, and if the job is being executed, the process proceeds to step 903, and if not, the process proceeds to step 908. Next, in step 903, in order to determine the setting, the activation control setting 504 is confirmed upon enabling of the application having the application ID 601 specified from the external device 403 in the activation control information 600 stored in the storage 104. If the setting is "cancel activation during job execution", the step ends. Additionally, if the setting is "activation after job ends", the process proceeds to step 904. Moreover, if the setting is "immediate activation", the process proceeds to step 908.

Subsequently, in step 904, an instruction to stop receiving job input from the operation unit is provided to the standard function control unit 301, job reception stops, and the process proceeds to step 905. Next, in step 905, the process waits for a job end notification from the standard function control unit 301. Upon receipt of the job end notification, the process proceeds to step 906. Next, in step 906, an instruction to activate the application with the specified ID is provided to the application execution control unit 305 and the process proceeds to step 907. Subsequently, if the application with the specified ID is a login program, the login screen 800 shown in FIG. 8 is displayed.

Next, in step 907, an instruction to restart job reception is provided to the standard function control unit 301 and the flow chart ends. Next, in step 908, an instruction to activate the application with the specified ID is provided to the application execution control unit 305, and the flowchart ends. In this case, since the application is activated during execution of a job that has been input from the operation unit, for example, the login screen 800 is displayed from the copy execution screen 710.

Figure 10:
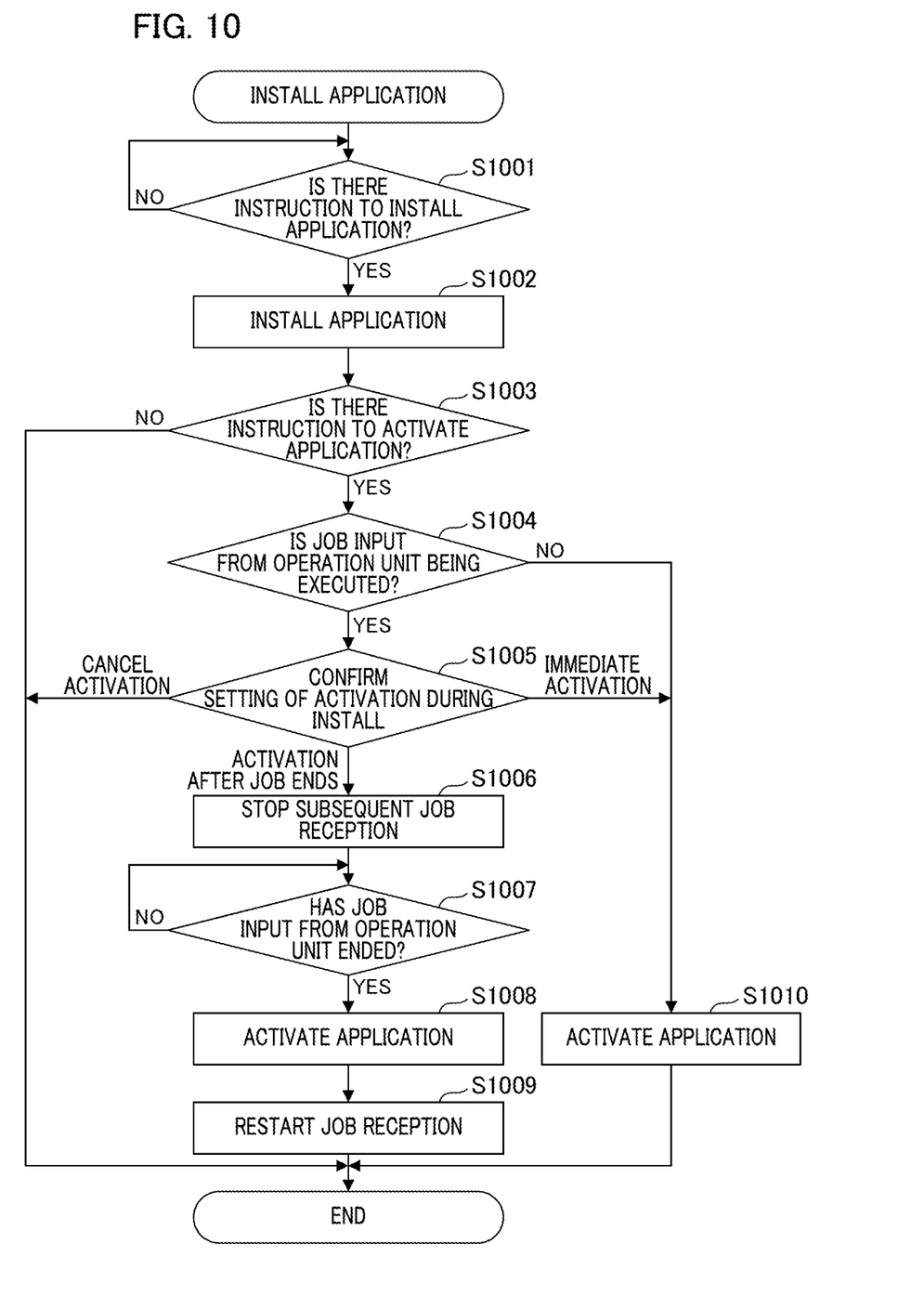
FIG. 10 is a flowchart illustrating an operation upon receipt of an install instruction.

FIG. 10 is an example of a flowchart illustrating an operation in a case where the application management unit 302 receives an instruction to install the application. In this flowchart, a process is executed if the application management unit 302 receives an instruction to install the application from the external device 403 via the servlet service 304. Each step is executed by the CPU 101.

First, in step 1001, the process waits for an instruction to install the application from the external device 403, and upon receipt of the install instruction, the process proceeds to step 1002. Next, in step 1002, the application that has been received from the external device 403 is installed, and the process proceeds to step 1003. During installation, the control information 500 is stored in association with an application ID that is determined during the installation with respect to the activation control information 600 that is stored in the storage 104.

Next, in step 1003, the activation control setting 503 of the control information 500 after installation of the application is confirmed. If "activation" is set, the process proceeds to step 1004, and if "stop" is set, the flowchart ends. Next, in step 1004, whether or not the job input from the operation unit I/F 106 is being executed is confirmed in the standard function control unit 301, and if the job is being executed, the process proceeds to step 1005, and if not, the process proceeds to step 1010. Next, in step 1005, in order to confirm the setting of the activation of the installed application during job execution, the activation control setting 504 in the control information 500 during enabling is confirmed. If the setting is "cancel activation during job execution", the step ends. If the setting is "activation after job ends", the process proceeds to step 1006. If the setting is "immediate activation", the process proceeds to step 1010.

Next, in step 1006, an instruction to stop receiving a job that has been input from the operation unit is provided to the standard function control unit 301, job reception stops, and the process proceeds to step 1007. Next, in step 1007, the process waits for the job end notification from the standard function control unit 301. Upon receipt of the job end notification, the process proceeds to step 1008. Next, in step 1008, an instruction to activate the installed application is provided to the application execution control unit 305, and the process proceeds to step 1009. Subsequently, if the application with the specified ID is a login program, the login screen 800 shown in FIG. 8 is displayed. Next, in step 1009, an instruction to restart job reception is provided to the standard function control unit 301, and the flowchart ends. Subsequently, in step 1010, an instruction to activate the installed application is provided to the application execution control unit 305 and the flowchart ends. In this case, since the application is activated during execution of job input from the operation unit, for example, the login screen 800 is displayed by the copy execution screen 710.

Figure 11:
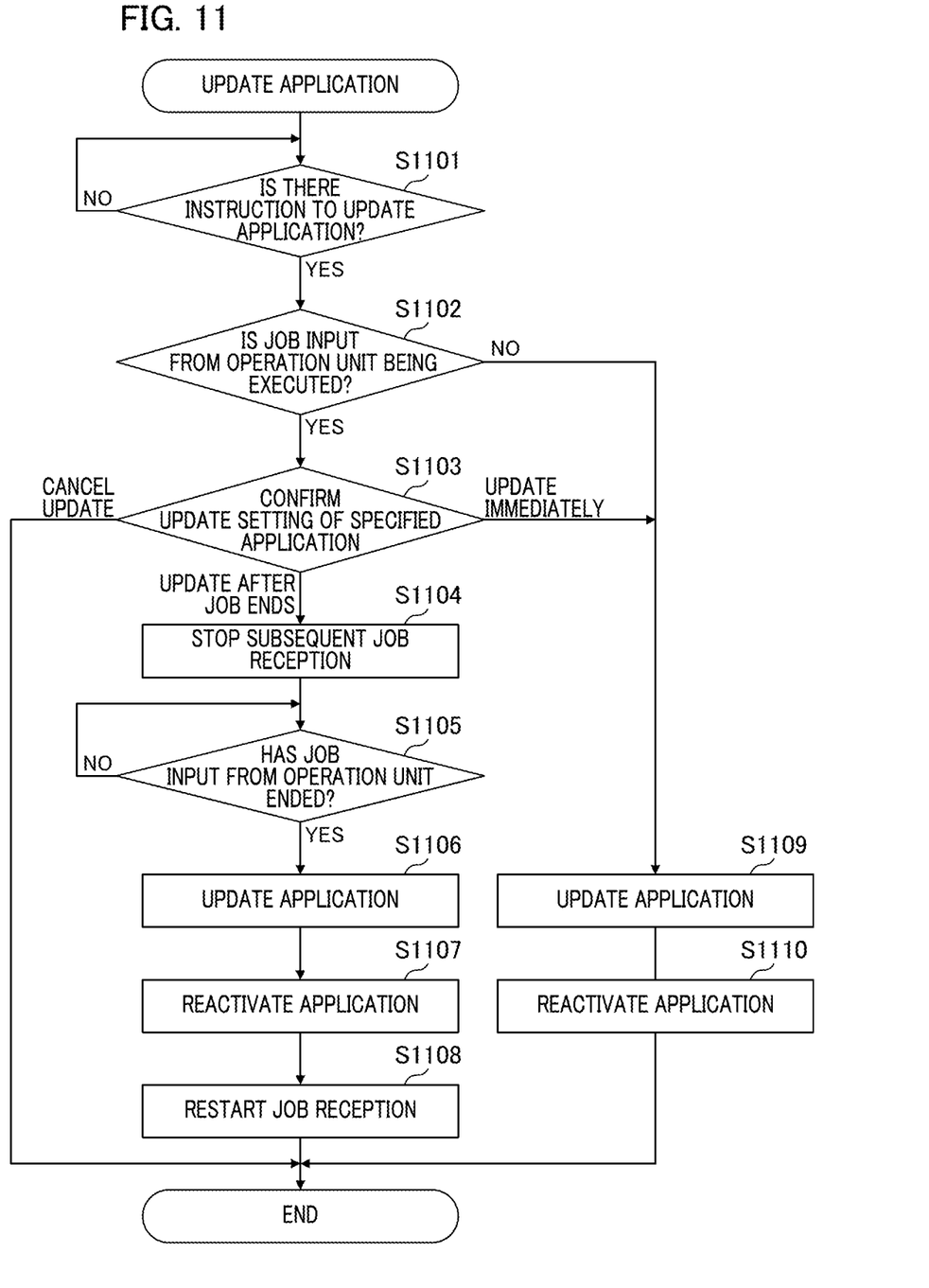
FIG. 11 is a flowchart illustrating an operation upon receipt of an update instruction.

FIG. 11 is an example of a flowchart showing the operation when the application management unit receives an instruction to update the application. In this flowchart, a process is executed if the application management unit 302 receives an instruction to update the application from the external device 403 via the servlet service 304. Each step is executed by the CPU 101.

First, in step 1101, the process waits for the update instruction from the servlet service 304, and upon receipt of the instruction, the process proceeds to step 1102. Next, in step 1102, whether or not the job input from the operation unit I/F 106 is being executed is confirmed in the standard function control unit 301. If the job is being executed, the process proceeds to step 1103, and if not, the process proceeds to step 1109. Next, in step 1103, the control setting 505 of the control information 500 during update of the application is confirmed.

If the setting is "cancel update during job execution", the step ends. If the setting is "update after job ends," the process proceeds to step 1104. If the setting is "immediate update", the process proceeds to step 1109. Next, in step 1104, an instruction to stop receiving the job input from the operation unit is provided to the standard function control unit 301, job reception stops, and the process proceeds to step 1105. Next, in step 1105, the process waits for a job end notification from the standard function control unit 301. Subsequently, upon receipt of the job end notification, the process proceeds to step 1106. In step 1106, the specified application is updated, and the process proceeds to step 1107.

Next, in step 1107, an instruction to reactivate the updated application is provided to the application execution control unit 305, and the process proceeds to step 1108. Next, in step 1108, an instruction to restart job reception is provided to the standard function control unit 301, and the flowchart ends. Next, in step 1109, the specified application is updated, and the process proceeds to step 1110. Subsequently, in step 1110, an instruction to reactivate the updated application is provided to the application execution control unit 305 and the flowchart ends. In this case, since the application is reactivated during execution of the job that has been input from the operation unit, for example, the login screen 800 is displayed from the copy execution screen 710.

As described above, according to the present embodiment, in enabling an application that occupies a screen of a device, for example, a login program, the timing for enabling the application can be set after the job ends. Hence, it is possible to avoid the event in which the screen switches due to the enabling of the application and the job cannot be cancelled.

According to the present embodiment, confirmation of whether or not the application to be a target is a login program has not been performed. However, the target to be applied in the present invention may be limited to an application in which "login management" is set to the attribute 501 by determining whether or not the application to be a target is a login program based on the attribute 501. In contrast, in disabling an application from being applied in the present invention, for example, an application in which "general purpose" is set to the attribute 501, the process may proceed to step 908 after "Yes" is determined in step 901. Similarly, in installing and activating the application not to be applied, the process may proceed to step 1010 after "Yes" is determined in step 1003. Similarly, in updating and reactivating the application not to be applied, the process may proceed to step 1109 after "Yes" is determined in step 1101.

According to the present embodiment, although the determination during job execution in step 902, step 1004, and step 1102 is limited to a job input from the operation unit, the present invention can be applied even if all jobs are targets.

According to the present embodiment, in step 903, the activation control setting 504 in the activation control information 600 during enabling of the extended application is confirmed, and the timing for activating the application is changed. However, the present invention is not limited thereto, and, for example, instead of using the activation control setting 504 during enabling of the extended application, a configuration in which the process proceeds to step 904 after "Yes" is determined in step 902 may be used.

According to the present embodiment, in step 1005, the activation control setting 503 of the control information 500 after install is confirmed, and the timing for activating the application is changed. However, the present invention is not limited thereto, and, for example, instead of using the activation control setting 503 after install, a configuration in which the process proceed to step 1006 after "Yes" is determined in step 1004 may be used.

According to the present embodiment, in step 1103, the control setting 505 of the control information 500 during update of the extended application is confirmed, and the timing for activating the application is changed. However, the present invention is not limited thereto, and, for example, instead of using the control setting 505 during update of the extended application, a configuration in which the process proceeds to step 1104 after "Yes" is determined in step 1102 may be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-095930, filed May 18, 2018, which is hereby incorporated by reference wherein in its entirety.

What is claimed is:

1. An information processing apparatus that can operate an application on firmware comprising:
   one or more memories that store a set of instructions; and
   one or more processors that execute the instructions to cause the information processing apparatus to perform operations comprising:
      receiving an instruction for activating a login application;
      determining whether a job is being executed upon receipt of the instruction to activate the login application;
      in a case where it is determined that the job is not being executed, activating the login application; and in a case where it is determined that the job is being executed, activating the login application after the job ends.

2. The information processing apparatus according to claim 1, wherein the one or more processors further execute the instructions to cause the information processing apparatus to perform operations comprising:
performing an operation in which the job is input via a screen,
wherein, in determining whether a job is being executed, whether the job that has been input via the screen is being executed is determined.

3. The information processing apparatus according to claim 2, wherein the application is an application that occupies the screen.

4. An information processing apparatus that can operate an application on firmware comprising:
one or more memories that store a set of instructions; and
one or more processors that execute the instructions to cause the information processing apparatus to perform operations comprising:
receiving an instruction for installing an application;
installing the application upon receipt of the instruction, and
determining whether a job is being executed,
wherein in a case where it is determined that the job is being executed and a setting to activate the application after installing the application is present, the application is activated after the job ends.

5. An information processing apparatus that can operate an application on firmware comprising:
one or more memories that store a set of instructions; and
one or more processors that execute the instructions to cause the information processing apparatus to perform operations comprising:
receiving an instruction for updating an application;
determining whether a job is being executed upon receipt of the instruction to update the application; and
updating the application,
wherein, in a case where it is determined that the job is being executed, the application is updated after the job ends.

6. A control method of an information processing apparatus that can operate an application on firmware comprising:
receiving an instruction for activating a login application;
determining whether a job is being executed upon receipt of the instruction to activate the login application;
in a case where it is determined that the job is not being executed, activating the login application; and
in a case where it is determined that the job is being executed, activating the login application after the job ends.

7. The control method according to claim 6, further comprising:
performing an operation in which the job is input via a screen,
wherein, in determining whether a job is being executed, whether the job that has been input via the screen is being executed is determined.

8. The control method according to claim 7,
wherein the application is an application that occupies the screen.

9. A control method of an information processing apparatus that can operate an application on firmware comprising:
receiving an instruction for installing an application;
installing the application upon receipt of the instruction, and
determining whether a job is being executed,
wherein in a case where it is determined that the job is being executed and a setting to activate the application after installing the application is present, the application is activated after the job ends.

10. A control method of an information processing apparatus that can operate an application on firmware comprising:
receiving an instruction for updating an application;
determining whether a job is being executed upon receipt of the instruction to update the application; and
updating the application,
wherein, in a case where it is determined that the job is being executed, the application is updated after the job ends.

11. A non-transitory recording medium storing a control program of an information processing apparatus that can operate an application on firmware causing a computer to perform each step of a control method of the information processing apparatus, the method comprising:
receiving an instruction for activating a login application;
determining whether a job is being executed upon receipt of the instruction to activate the login application;
in a case where it is determined that the job is not being executed, activating the login application; and
in a case where it is determined that the job is being executed, activating the login application after the job ends.

* * * * *